United States Patent
Gomez-Mower et al.

(10) Patent No.: US 11,865,532 B2
(45) Date of Patent: Jan. 9, 2024

(54) SYSTEMS AND METHODS FOR RECYCLING WASTE ION EXCHANGE MATERIALS

(71) Applicant: CORNING INCORPORATED, Corning, NY (US)

(72) Inventors: Sinue Gomez-Mower, Corning, NY (US); Kai Tod Paul Jarosch, Corning, NY (US); Matthew Andrews Sevem, Wellsboro, PA (US)

(73) Assignee: CORNING INCORPORATED, Corning, NY (US)

( * ) Notice: Subject to any disclaimer, the term of this patent is extended or adjusted under 35 U.S.C. 154(b) by 35 days.

(21) Appl. No.: 17/400,161

(22) Filed: Aug. 12, 2021

(65) Prior Publication Data

US 2022/0048020 A1 Feb. 17, 2022

Related U.S. Application Data

(60) Provisional application No. 63/066,470, filed on Aug. 17, 2020.

(51) Int. Cl.
*B01J 49/00* (2017.01)
*B01J 39/09* (2017.01)
(Continued)

(52) U.S. Cl.
CPC .............. *B01J 49/00* (2013.01); *B01J 20/04* (2013.01); *B01J 20/28016* (2013.01); *B01J 39/09* (2017.01); *B09B 3/00* (2013.01)

(58) Field of Classification Search
CPC .. B01J 49/00; B01J 39/09; B01J 20/04; B09B 3/00
See application file for complete search history.

(56) References Cited

U.S. PATENT DOCUMENTS 2,888,495 A    5/1959   Kissling
3,336,731 A    8/1967   Phillips et al.
(Continued)

FOREIGN PATENT DOCUMENTS

AU    2013211472 B2    3/2016
CN    104310444 A      1/2015
(Continued)

OTHER PUBLICATIONS

Araujo et al; "Ion Exchange Equilibria Between Glass and Molten Salts"; Journal of Non-Crystalline Solids; 318; pp. 262-267 (2003).
(Continued)

*Primary Examiner* — Anthony J Zimmer
*Assistant Examiner* — Jordan W Taylor
(74) *Attorney, Agent, or Firm* — F. Brock Riggs

(57) ABSTRACT

Embodiments of the present disclosure are directed to methods for recycling waste ion exchange materials comprising a first alkali metal salt and a second alkali metal salt comprising reducing the size of the waste ion exchange materials to produce a plurality of waste ion exchange particles having particle sizes from 0.10 mm to 5.0 mm, and regenerating the plurality of waste ion exchange particles to produce a plurality of regenerated ion exchange particles having a concentration of the first alkali metal salt greater than a concentration of the first alkali metal salt in the waste ion exchange materials. Systems for recycling a waste ion exchange materials comprising a first alkali metal salt and a second alkali metal salt are also disclosed.

19 Claims, 3 Drawing Sheets

(51) Int. Cl.
*B01J 20/04* (2006.01)
*B01J 20/28* (2006.01)
*B09B 3/00* (2022.01)

(56) References Cited

U.S. PATENT DOCUMENTS

| | | | |
|---|---|---|---|
| 3,385,759 | A | 5/1968 | Bettis et al. |
| 3,395,999 | A | 8/1968 | Lewek |
| 3,441,398 | A | 4/1969 | Hess |
| 3,711,393 | A | 1/1973 | Garfinkel |
| 3,730,871 | A | 5/1973 | Boffe |
| 3,933,127 | A | 1/1976 | Arps |
| 4,689,146 | A | 8/1987 | Kasai et al. |
| 5,015,288 | A | 5/1991 | Kusik et al. |
| 5,846,278 | A | 12/1998 | Jantzen et al. |
| 6,190,548 | B1 | 2/2001 | Frick |
| 6,534,120 | B1 | 3/2003 | Ozawa et al. |
| 7,419,530 | B2 | 9/2008 | De Vries et al. |
| 8,551,898 | B2 | 10/2013 | Danielson et al. |
| 8,834,806 | B2 | 9/2014 | Mizrahi |
| 8,956,424 | B2 | 2/2015 | Yang |
| 8,980,777 | B2 | 3/2015 | Danielson et al. |
| 10,202,300 | B2 | 2/2019 | Hart et al. |
| 10,556,826 | B2 | 2/2020 | Amin et al. |
| 2005/0181931 | A1 | 8/2005 | Mouri et al. |
| 2009/0241731 | A1 | 10/2009 | Pereira et al. |
| 2012/0210749 | A1 | 8/2012 | Feng et al. |
| 2013/0219965 | A1 | 8/2013 | Allan et al. |
| 2014/0366579 | A1 | 12/2014 | Antoine et al. |
| 2015/0152344 | A1 | 6/2015 | Gueh |
| 2016/0200629 | A1 | 7/2016 | Ikawa et al. |
| 2017/0282503 | A1 | 10/2017 | Peng et al. |
| 2017/0305788 | A1 | 10/2017 | Nikulin |
| 2018/0148373 | A1 | 5/2018 | Harris et al. |
| 2018/0327305 | A1 | 11/2018 | Amin et al. |
| 2018/0362399 | A1* | 12/2018 | Amin et al. |
| 2019/0062207 | A1 | 2/2019 | Jin |
| 2020/0102244 | A1 | 4/2020 | Li et al. |
| 2020/0171478 | A1 | 6/2020 | Bernard et al. |
| 2020/0172434 | A1 | 6/2020 | Dafin et al. |

FOREIGN PATENT DOCUMENTS

| | | | |
|---|---|---|---|
| CN | 104445293 | A | 3/2015 |
| CN | 105555730 | A | 5/2016 |
| CN | 105593177 | A | 5/2016 |
| CN | 106629785 | A | 5/2017 |
| CN | 107108305 | A | 8/2017 |
| CN | 107207315 | A | 9/2017 |
| CN | 107311205 | A | 11/2017 |
| CN | 108975667 | A | 12/2018 |
| CN | 110342834 | A | 10/2019 |
| CN | 209612365 | U | 11/2019 |
| JP | 2015151315 | A * | 8/2015 |
| JP | 6273816 | B2 * | 2/2018 |
| WO | 2014/045977 | A1 | 3/2014 |
| WO | 2014/045979 | A1 | 3/2014 |
| WO | 2015/080095 | A1 | 6/2015 |

OTHER PUBLICATIONS

Arthur "An investigation into the thermophysical and rheological properties of nanofluids for solar thermal applications" Renewable and Sustainable Energy Reviews 55 (2016) 739-755.

Bartholomew "A Study of the Equilibrium $KNO_3(I) \Leftrightarrow KNO_2(I) + 1/2O_2$ (g) Over the Temperature Range 550-750°" J. Phys. Chem. (1966) 3442-3446.

Freeman "The Kinetics of the Thermal Decomposition of Sodium Nitrate and of the Reaction Between Sodium Nitrite and Oxygen" J. Phys. Chem. 60(11) 1487-1493.

Freeman "The Kinetics of Thermal Decomposition of Potassium Nitrate and of the Reaction Between Potassium Nitrate and Oxygen" J. Am. Chem. Soc. (Feb. 20, 1957) 838-842.

International Search Report and Written Opinion of the International Searching Authority; PCT/US2021/019344, dated Jun. 24, 2021; 10 pages; European Patent Office.

Kramer "Differential Scanning Calorimetry of Sodium and Potassium Nitrates and Nitrites" Thermochimica Acta 55 (1982) 11-17.

Lindauer et al, "Design Construction and Testing of a Large Molten Salt Filter", Oak Ridge National Laboratory (1969).

McCabe et al., "Unit Operations in Chemical Engineering" Fourth Edition 1985 pp. 749-758.

Xiao-Fu et al., "Separation of sodium and potassium using adsorption—elution/crystallization scheme from bittern", Chemical Engineering Research and Design, vol. 161, 2020, pp. 72-81.

International Search Report and Written Opinion of the International Searching Authority; PCT/US2021/044582, dated Nov. 15, 2021; 12 pages; European Patent Office.

* cited by examiner

SYSTEMS AND METHODS FOR RECYCLING WASTE ION EXCHANGE MATERIALS

CROSS-REFERENCE TO RELATED APPLICATIONS

This application claims the benefit of priority under 35 U.S.C. § 119 of U.S. Provisional Application Ser. No. 63/066,470 filed on Aug. 17, 2020, the content of which is relied upon and incorporated herein by reference in its entirety.

TECHNICAL FIELD

The present specification generally relates to the chemical strengthening of glass articles via ion exchange processes and, more particularly, to systems and methods for recycling waste ion exchange materials.

BACKGROUND

Tempered or strengthened glass may be used in a variety of applications. For example, strengthened glass may be used in consumer electronic devices, such as smart phones and tablets, pharmaceutical packaging, and automobiles because of its physical durability and resistance to breakage. However, conventional strengthening processes, such as conventional ion exchange processes, have significant inefficiencies. For example, as much as 95% of waste ion exchange materials, which are disposed of after use in ion exchange processes, remain suitable for use. This may be a result of, at least in part, unsuitable or impracticable methods of recycling such waste ion exchange materials.

Accordingly, a need exists for alternative systems and methods for recycling waste ion exchange materials.

SUMMARY

According to a first aspect, a method for recycling waste ion exchange materials comprising a first alkali metal salt and a second alkali metal salt comprises reducing the size of the waste ion exchange materials to produce a plurality of waste ion exchange particles having particle sizes from 0.10 mm to 5.0 mm; and regenerating the plurality of waste ion exchange particles to produce a plurality of regenerated ion exchange materials having a concentration of the first alkali metal salt greater than a concentration of the first alkali metal salt in the waste ion exchange materials.

A second aspect includes the method of the first aspect, wherein the waste ion exchange materials comprise less than or equal to 95 wt. % of the first alkali metal salt based on the total weight of the waste ion exchange materials.

A third aspect includes the method of either the first or second aspect, wherein the waste ion exchange materials comprise greater than or equal to 4 wt. % of the second alkali metal salt based on the total weight of the waste ion exchange materials.

A fourth aspect includes the method of any of the first through third aspects, wherein reducing the size of the waste ion exchange materials comprises introducing the waste ion exchange materials to a size reduction unit operable to crush the waste ion exchange materials.

A fifth aspect includes the method of any of the first through fourth aspects, wherein regenerating the plurality of waste ion exchange particles comprises contacting the plurality of waste ion exchange particles with an aqueous solution saturated with the first alkali metal salt to form a regenerated ion exchange slurry; and separating the regenerated ion exchange slurry to produce a recycled aqueous solution and the plurality of regenerated ion exchange materials.

A sixth aspect includes the method of the fifth aspect, wherein the plurality of waste ion exchange particles contacts the aqueous solution saturated with the first alkali metal salt for a time of from 0.5 hours to 24 hours.

A seventh aspect includes the method of either the fifth or sixth aspect, wherein the plurality of waste ion exchange particles contacts the aqueous solution saturated with the first alkali metal salt at a temperature less than 20° C.

An eighth aspect includes the method of any of the fifth through seventh aspects, wherein contacting the plurality of waste ion exchange particles with the aqueous solution saturated with the first alkali metal salt comprises passing the plurality of waste ion exchange particles to a regeneration unit operable to contact the plurality of waste ion exchange particles with the aqueous solution saturated with the first alkali metal salt.

A ninth aspect includes the method of any of the fifth through eighth aspects, wherein separating the regenerated ion exchange slurry comprises passing the regenerated ion exchange slurry to a separation unit operable to separate solid particles of the regenerated ion exchange materials from liquid of the recycled aqueous solution.

A tenth aspect includes the method of any of the first through ninth aspects, further comprising drying the plurality of regenerated ion exchange materials to produce recycled ion exchange materials.

An eleventh aspect includes the method of the tenth aspect, wherein the recycled ion exchange materials comprise less than 1 wt. % of water based on the total weight of the recycled ion exchange materials.

A twelfth aspect includes the method of either the tenth or eleventh aspect, wherein the recycled ion exchange materials comprise greater than 95 wt. % of the first alkali metal salt based on the total weight of the recycled ion exchange materials.

A thirteenth aspect includes the method of any of the tenth through twelfth aspects, wherein the recycled ion exchange materials have particle sizes from 0.10 mm to 5.0 mm.

A fourteenth aspect includes the method of any of the tenth through thirteenth aspects, wherein drying the plurality of regenerated ion exchange materials comprises passing the plurality of regenerated ion exchange materials to a drying unit operable to heat the plurality of regenerated ion exchange materials.

A fifteenth aspect includes the method of any of the tenth through fourteenth aspects, further comprising heating the recycled ion exchange materials to an ion exchange temperature to form a molten salt; and submerging a glass article into the molten salt such that an ion exchange between the molten salt and the glass article occurs.

According to a sixteenth aspect, a system for recycling a waste ion exchange materials comprising a first alkali metal salt and a second alkali metal salt comprises a size reduction unit operable to crush the waste ion exchange materials to produce a plurality of waste ion exchange particles having particle sizes from 0.10 mm to 5.0 mm; a regeneration unit downstream of the size reduction unit, the regeneration unit operable to contact the plurality of waste ion exchange particles with an aqueous solution saturated with the first alkali metal salt, the contact causing at least a portion of the second alkali metal salt to diffuse from the waste ion exchange particles and produce a regenerated ion exchange slurry; and a separation unit downstream of the regeneration unit, the separation unit operable to separate the regenerated ion exchange slurry to produce a plurality of regenerated ion exchange materials and a recycled aqueous solution.

A seventeenth aspect includes the system of the sixteenth aspect, wherein the regeneration unit is operable to contact the plurality of waste ion exchange particles with the aqueous solution saturated with the first alkali metal salt for a time of from 1.0 hours to 2.0 hours.

An eighteenth aspect includes the system of either the sixteenth or seventeenth aspect, wherein the regeneration unit is operable to contact the plurality of waste ion exchange particles with the aqueous solution saturated with the first alkali metal salt at a temperature less than 20° C.

A nineteenth aspect includes the system of any of the sixteenth through eighteenth aspects, further comprising a drying unit downstream of the separation unit, the drying unit operable to heat the regenerated ion exchange materials to produce recycled ion exchange materials comprising less than 1 wt. % of water based on the total weight of the recycled ion exchange materials.

A twentieth aspect includes the system of the nineteenth aspect, wherein the recycled ion exchange materials comprise greater than 95 wt. % of the first alkali metal salt based on the total weight of the recycled ion exchange materials.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 2:
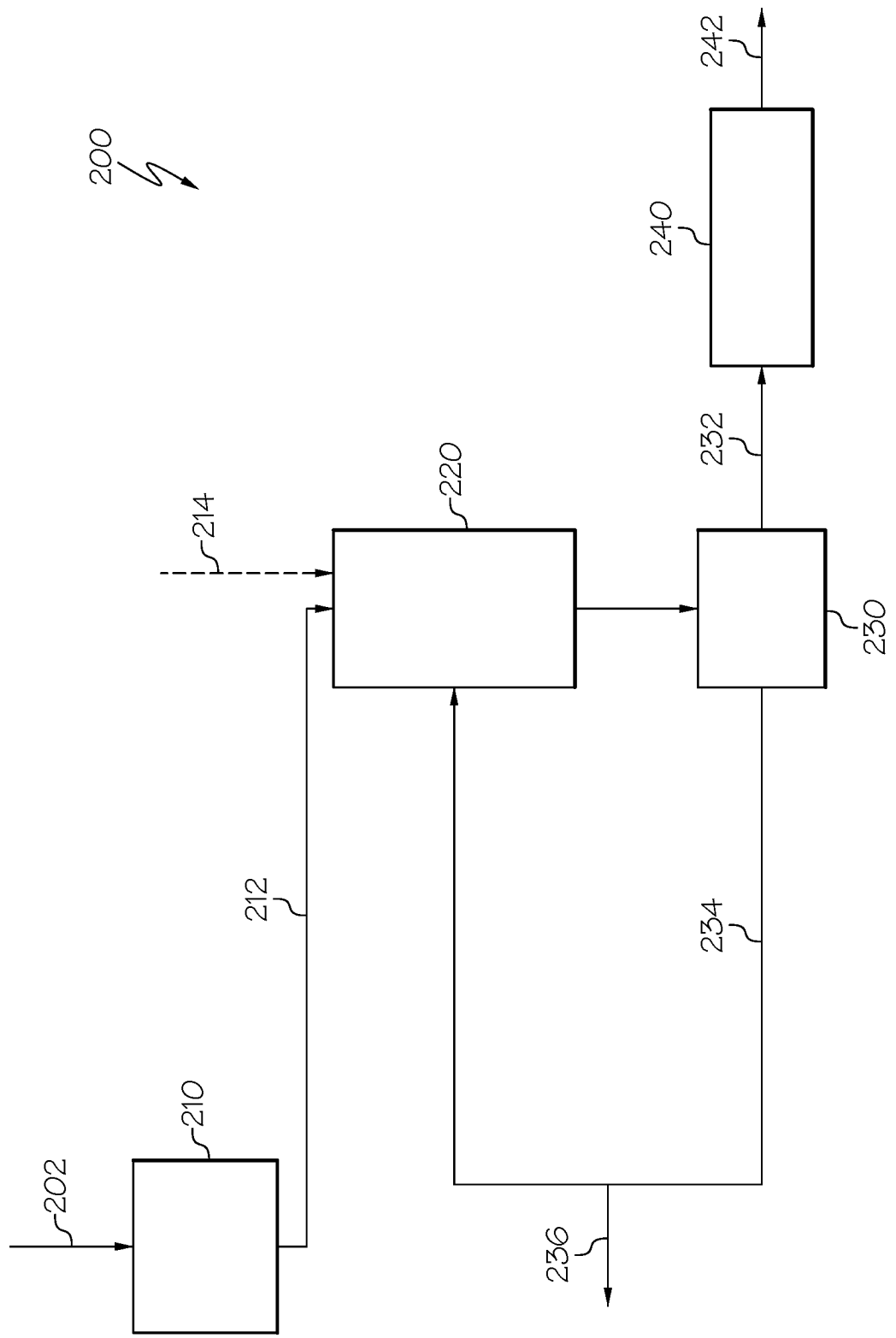
FIG. 2 schematically depicts a generalized flow diagram of a system for recycling waste ion exchange materials, according to one or more embodiments shown and described herein.

When describing the simplified schematic illustration of FIG. 2, the numerous valves, temperature sensors, electronic controllers, and the like, which may be used and are well known to a person of ordinary skill in the art, are not included. However, a person of ordinary skill in the art understands that these components are within the scope of the present disclosure.

Additionally, the arrows in the simplified schematic illustration of FIG. 2 refer to the transfer or flow of materials. However, the arrows may equivalently refer to transfer lines, which may transfer such materials between two or more system components. Arrows that connect to one or more system components signify inlets or outlets in the given system components and arrows that connect to only one system component signify a system outlet that exits the depicted system or a system inlet that enters the depicted system. The arrow direction generally corresponds with the major direction of movement of the materials or the materials contained within the physical transfer line signified by the arrow.

The arrows in the simplified schematic illustration of FIG. 2 may also refer to process steps of transporting materials from one system component to another system component. For example, an arrow from a first system component pointing to a second system component may signify "passing" materials from the first system component to the second system component, which may comprise the materials "exiting" or being "removed" from the first system component and "introducing" the materials to the second system component.

DETAILED DESCRIPTION

Embodiments described herein are directed to systems and methods for recycling waste ion exchange materials. Systems for recycling waste ion exchange materials according to the present disclosure may generally comprise a size reduction unit, a regenerating unit downstream of the size reduction unit, a separation unit downstream of the regenerating unit, and a drying unit downstream of the separation unit. In operation, methods for recycling waste ion exchange materials according to the present disclosure may generally comprise reducing the size of the waste ion exchange materials to produce a plurality of waste ion exchange particles, regenerating the plurality of waste ion exchange particles to produce a plurality of regenerated ion exchange particles, and drying the plurality of regenerated ion exchange particles to produce a plurality of recycled ion exchange particles. Various embodiments of the systems and methods of the present disclosure will be described herein with specific reference to the appended drawings.

As used in the present disclosure, the indefinite articles "a" and "an," when referring to elements of the present disclosure, mean that least one of these elements are present. Although these indefinite articles are conventionally employed to signify that the modified noun is a singular noun, the indefinite articles "a" and "an" also include the plural in the present disclosure, unless stated otherwise. Similarly, the definite article "the" also signifies that the modified noun may be singular or plural in the present disclosure, unless stated otherwise.

As used in the present disclosure, the term "or" is inclusive and, in particular, the term "A or B" refers to "A, B, or both A and B." Alternatively, the term "or" may be used in the exclusive sense only when explicitly designated in the present disclosure, such as by the terms "either A or B" or "one of A or B."

As used in the present disclosure, the term "directly" refers to the passing of materials, such as waste ion exchange particles, from a first component of a system to a second component of the system without passing through any intervening components operable to change the composition or characteristics of the materials. Similarly, the term "directly" also refers to the introduction of materials, such as waste ion exchange materials, directly to a component of a system without passing through any preliminary components operable to change the composition or characteristics of the materials. Intervening or preliminary components or systems operable to change the composition or characteristics of the materials may comprise furnaces, separators, and the like, but are not generally intended to include valves, pumps, sensors, or other ancillary components required for the general operation of a system.

As used in the present disclosure, the terms "downstream" and "upstream" refer to the positioning of components of a system relative to a direction of flow of materials through the system. For example, a second component of a system may be considered "downstream" of a first component of the system if materials flowing through the system encounter the first component before encountering the second component. Likewise, the first component of the system may be considered "upstream" of the second system of the system if the materials flowing through the system encounter the first system before encountering the second system.

It should be understood that a flow of materials may be named for the components within the flow of materials, and the component for which the flow of materials is named may be the major component of the flow of materials (such as comprising from 50 wt. %, from 70 wt. %, from 90 wt. %, from 95 wt. %, from 99 wt. %, from 99.5 wt. %, or from 99.9 wt. % of the flow of materials to 100 wt. % of the flow of materials). For example, a flow of materials, which from a first system component to a second system component, may comprise from 50 wt. % to 100 wt. % of waste ion exchange particles and, as a result, the flow of materials may also be named "waste ion exchange particles." It should also be understood that components are disclosed as passing from one system component to another when a flow of materials comprising that component is disclosed as passing from that system component to another. For example, disclosed a flow of waste ion exchange particles from a first system component to a second system component should be understood to equivalently disclose waste ion exchange particles passing from the first system component to the second system component.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Figure 1A:
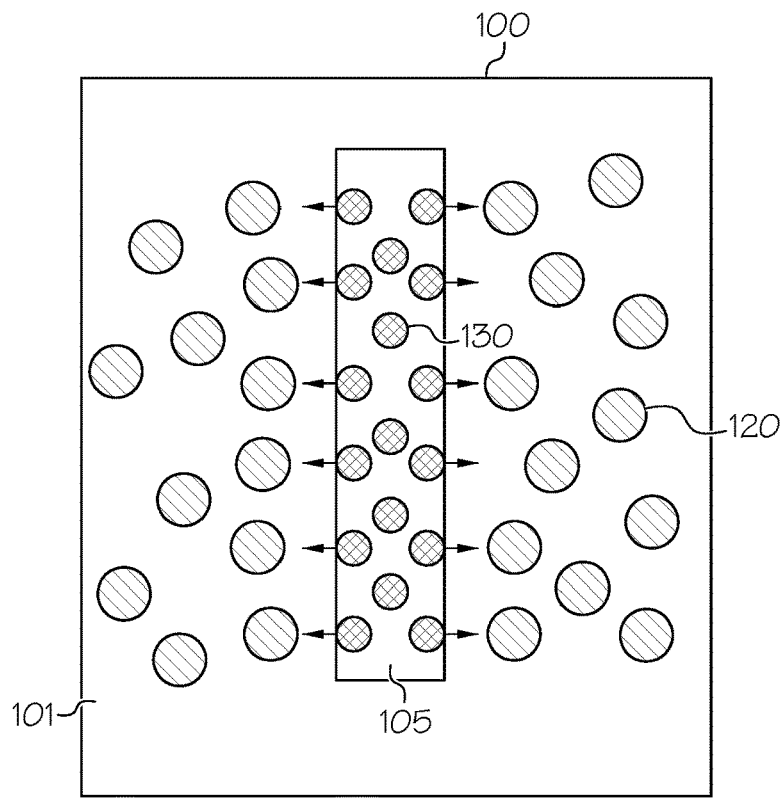
FIG. 1A schematically depicts a portion of an ion exchange process, according to one or more embodiments shown and described herein.
Figure 1B:
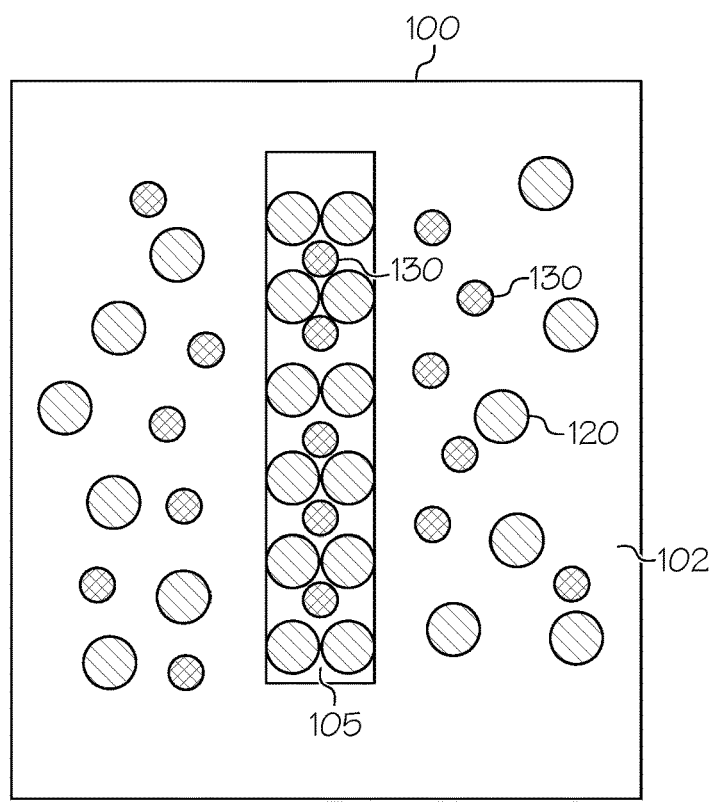
FIG. 1B schematically depicts a portion of an ion exchange process, according to one or more embodiments shown and described herein.

Referring initially to FIGS. 1A and 1B, a conventional ion exchange process is schematically depicted. The ion exchange process includes immersing a glass article 105 in a salt bath 100. The glass article 105 may contain relatively smaller cations 130, for example, alkali metal cations such as $Li^+$ and/or $Na^+$ cations. The salt bath 100 may include a molten salt 101 containing relatively larger cations 120 (i.e., relative to the cations 130 of the glass article). That is, the cations 120 may have an atomic radius larger than an atomic radius of the cations 130. The cations 120 may include, for example, alkali metal cations, such as potassium ($K^+$) cations. The larger cations 120 may have disassociated from a salt, such as an alkali metal nitrate, present in the salt bath 100 when heated to an elevated temperature to produce the molten salt 101. When the glass article 105 is immersed in the salt bath 100, the cations 130 within the glass article 105 may diffuse from the glass article 105 and into the molten salt 101. Referring now to FIG. 1B, the cations 120 from the molten salt 101 may replace the cations 130 in the glass article 105 after such diffusion. This substitution of larger cations for smaller cations in the glass article 105 creates a surface compressive stress (CS) at the surface of the glass article 105 that extends to a depth of compression (DOC), which may increase the mechanical strength of the glass article 105 and improve the resistance of the glass article 105 to breakage.

Generally, multiple glass articles may be immersed in a single salt bath in batches in order to increase the efficiency of the ion exchange process. However, as the batchwise production of strengthened glass articles continues in the same salt bath, the ion exchange process will naturally result in an increase in the concentration of smaller cations in the molten salt and a decrease in the concentration of larger cations in the molten salt. As the concentration of smaller cations in the molten salt increases, the efficacy of the salt bath may decrease, given a fixed temperature and immersion time. This efficacy may continue to decrease until the compressive stress and depth of compression achieved in the glass articles are below a predetermined threshold. For example, when the salt bath is utilized to exchange sodium cations present in the glass articles for potassium cations in the molten salt, the salt bath may no longer be considered effective when the concentration of sodium cations in the molten salt bath is greater than or equal to 1.5 wt. % (i.e., approximately 5 wt. % sodium nitrate). Once the salt bath is no longer effective, it may be disposed of. As a result, as much as 95 wt. % of the disposed material may be a usable alkali metal salt. Therefore, significant savings may be achieved if waste ion exchange materials may be recycled and reused.

One approach to recycle waste ion exchange materials may be fractional recrystallization. Fractional recrystallization is generally a method of separating two substances via the exploitation of the solubility differences of the two substances. During a fractional recrystallization process, waste ion exchange material consisting of first and second salts is dissolved in a solvent, such as water, at an elevated temperature to form a saturated or nearly saturated solution. The solution is then cooled, which causes only one of the salts to precipitate due to the inverse solubility of the first and second salts. For example, potassium nitrate is more soluble in water than sodium nitrate at relatively warmer temperatures and sodium nitrate is more soluble in water than potassium nitrate at relatively cooler temperatures. Therefore, as a solution comprising the two salts is cooled, only potassium nitrate will precipitate so long as the concentration of the sodium nitrate is not sufficient to saturate the solution at the cooler temperatures.

While fractional recrystallization may allow for the recycle of waste ion exchange materials, fractional recrystallization also presents a number of drawbacks. For example, as fractional recrystallization relies on the exploitation of the solubility differences of the two substances, such a solubility difference, particularly an inverted solubility relationship, is required in order for fractional recrystallization to be effective. Moreover, fractional recrystallization may be more effective the greater the difference between the temperature of the heated saturated solution and the temperature of the cooled precipitate. Such significant heating and cooling of the solution is energy intensive and the particle size of the separated salt is relatively uncontrollable.

A second approach to recycle waste ion exchange materials may be fractional melting. Fractional melting is generally a method of separating two substances via the exploitation of melting point differences of the two substances. During a fractional melting process, waste ion exchange material consisting of first and second salts is heated to a temperature greater than the melting point of the first salt and less than the melting point of the second salt. For example, a fractional melting process may separate potassium nitrate and sodium nitrate by heating the salts to a temperature between 308° C. (i.e., the melting point of sodium nitrate) and 334° C. (i.e., the melting point of potassium nitrate) and then separating the liquefied sodium nitrate from the solid potassium nitrate. While fractional melting may allow for the recycle of waste ion exchange materials, fractional melting generally requires energy intensive heating cycles to achieve a suitable separation.

A third approach to recycle waste ion exchange materials may be ion exchange separation. Ion exchange separation is generally a method of separating two substances via an ion exchange process. During an ion exchange separation, waste ion exchange material consisting of first and second salts is dissolved in a solvent, such as water, to form a solution. The solution is then exposed to an ion exchange medium that exchanges the cations of one of the salts for the cations of the other salt, and cooled to precipitate the desired salt. For example, an ion exchange separation may separate potassium nitrate and sodium nitrate by exposing a solution comprising the salts to an ion exchange medium that exchanges sodium ions in the solution for potassium ions in the ion exchange medium. The ion-exchanged solution may then be cooled to precipitate potassium nitrate. While ion exchange separation may allow for the recycle of waste ion exchange materials, ion exchange separation has not been successfully implemented and requires energy intensive heating steps to dissolve the waste ion exchange materials.

A fourth approach to recycle waste ion exchange materials, which may be used in conjunction with one or more of the previously described methods, may utilize the co-ion effect. In such processes, a solution comprising a first salt and a second salt is oversaturated with cations of one of the salts via the addition of a co-ion, which displaces the cations of the other salt from any precipitated solids. For example, potash (i.e., $K_2CO_3$) may be added to a solution comprising potassium nitrate and sodium nitrate, which oversaturates the solution with potassium cations and causes any nitrates that precipitate during cooling of the solution to be potassium nitrates. While the co-ion effect may allow for the recycle of waste ion exchange materials, as noted previously the co-ion effect must be used in conjunction with at least one other process, such as fractional recrystallization, and may also contaminate the precipitated salt with the anion of the co-ion, such as the carbonate ion of potash.

The present disclosure is directed to systems and methods for recycling waste ion exchange materials that address one or more of the drawbacks of the previously described methods. In particular, the systems and methods of the present disclosure utilize a "cold extraction" process to recycle waste ion exchange materials. Such a cold extraction process generally comprises the regeneration of solid waste ion exchange materials via contact with a solution saturated with the desired salt at temperatures below room temperature (i.e., less than 20° C.). This process exhibits the ability to produce recycled ion exchange particles of suitable purity, which may be re-used for one or more ion exchange processes. Moreover, this process eliminates the need to dissolve the waste ion exchange materials at elevated temperatures and allows for significant control over the particle size of the recycled ion exchange particles.

Referring now to FIG. 2, a system 200 for recycling waste ion exchange materials 202 is schematically depicted. The system 200 may comprise a size reduction unit 210, a regeneration unit 220 downstream of the size reduction unit 210, a separation unit 230 downstream of the regeneration unit 220, and a drying unit 240 downstream of the separation unit 230.

The waste ion exchange materials 202 may generally comprise the cooled and/or solidified contents of a molten salt that has been used to effect the ion exchange process with one or more glass (or glass-ceramic) articles and is no longer considered effective. As used in the present disclosure, the term "molten salt," which may also be referred to as an "ion exchange bath" or a "salt bath," refers to a solution or medium used to effect an ion exchange process with one or more glass (or glass-ceramic) articles, in which cations within the surface of the glass articles are replaced or exchanged with cations that are present in the molten salt. Fresh molten salt (i.e., molten salt that has not been used to effect any ion exchange processes) may comprise one or more alkali metal salts, such as potassium nitrate ($KNO_3$), sodium nitrate ($NaNO_3$) and/or lithium nitrate ($LiNO_3$). As described previously, one or more additional alkali metal salts may form in the molten salt as a result of ion exchange processes and the concentration of the one or more alkali metal salts present in the fresh molten salt may decrease. Molten salt may be considered to be no longer effective when the concentration of the one or more alkali metal salts present in the fresh molten salt is less than or equal to 95 wt. % of the molten salt. For example, a fresh molten salt that comprises 100 wt. % of potassium nitrate, will be considered to be no longer effective once the concentration of the potassium nitrate is less than or equal to 95 wt. %. Similarly, a fresh molten salt that comprises 100 wt. % of potassium nitrate and lithium nitrate, will be considered to be no longer effective once the sum of the concentrations of the potassium nitrate and lithium nitrate is less than or equal to 95 wt. %.

In embodiments, the waste ion exchange materials 202 may comprise less than or equal to 95 wt. % of a first alkali metal salt, such as potassium nitrate, based on the total weight of the waste ion exchange materials 202. For example, the waste ion exchange materials 202 may comprise from 5 wt. % to 95 wt. %, from 5 wt. % to 85 wt. %, from 5 wt. % to 75 wt. %, from 5 wt. % to 65 wt. %, from 5 wt. % to 55 wt. %, from 5 wt. % to 45 wt. %, from 5 wt. % to 35 wt. %, from 5 wt. % to 25 wt. %, from 5 wt. % to 15 wt. %, from 15 wt. % to 95 wt. %, from 15 wt. % to 85 wt. %, from 15 wt. % to 75 wt. %, from 15 wt. % to 65 wt. %, from 15 wt. % to 55 wt. %, from 15 wt. % to 45 wt. %, from 15 wt. % to 35 wt. %, from 15 wt. % to 25 wt. %, from 25 wt. % to 95 wt. %, from 25 wt. % to 85 wt. %, from 25 wt. % to 75 wt. %, from 25 wt. % to 65 wt. %, from 25 wt. % to 55 wt. %, from 25 wt. % to 45 wt. %, from 25 wt. % to 35 wt. %, from 35 wt. % to 95 wt. %, from 35 wt. % to 85 wt. %, from 35 wt. % to 75 wt. %, from 35 wt. % to 65 wt. %, from 35 wt. % to 55 wt. %, from 35 wt. % to 45 wt. %, from 45 wt. % to 95 wt. %, from 45 wt. % to 85 wt. %, from 45 wt. % to 75 wt. %, from 45 wt. % to 65 wt. %, from 45 wt. % to 55 wt. %, from 55 wt. % to 95 wt. %, from 55 wt. % to 85 wt. %, from 55 wt. % to 75 wt. %, from 55 wt. % to 65 wt. %, from 65 wt. % to 95 wt. %, from 65 wt. % to 85 wt. %, from 65 wt. % to 75 wt. %, from 75 wt. % to 95 wt. %, from 75 wt. % to 85 wt. %, or from 85 wt. % to 95 wt. % of the first alkali metal salt based on the total weight of the waste ion exchange materials 202.

The waste ion exchange materials 202 may further comprise a second alkali metal salt. The second alkali metal salt may generally correspond to the alkali metal cations that diffuse from the glass articles that underwent ion exchange in the molten salt. For example, if the molten salt was used to effectuate the diffusion of sodium cation from glass articles, the second alkali metal salt may comprise sodium nitrate. The waste ion exchange materials 202 may further comprise greater than or equal to 4 wt. % of the second alkali metal salt, such as sodium nitrate, based on the total weight of the waste ion exchange materials 202. For example, the waste ion exchange materials 202 may further comprise from 4 wt. % to 95 wt. %, from 4 wt. % to 85 wt. %, from 4 wt. % to 75 wt. %, from 4 wt. % to 65 wt. %, from 4 wt. % to 55 wt. %, from 4 wt. % to 45 wt. %, from 4 wt. % to 35 wt. %, from 4 wt. % to 25 wt. %, from 4 wt. % to 15 wt. %, from 15 wt. % to 95 wt. %, from 15 wt. % to 85 wt. %, from 15 wt. % to 75 wt. %, from 15 wt. % to 65 wt. %, from 15 wt. % to 55 wt. %, from 15 wt. % to 45 wt. %, from 15 wt. % to 35 wt. %, from 15 wt. % to 25 wt. %, from 25 wt. % to 95 wt. %, from 25 wt. % to 85 wt. %, from 25 wt. % to 75 wt. %, from 25 wt. % to 65 wt. %, from 25 wt. % to 55 wt. %, from 25 wt. % to 45 wt. %, from 25 wt. % to 35 wt. %, from 35 wt. % to 95 wt. %, from 35 wt. % to 85 wt. %, from 35 wt. % to 75 wt. %, from 35 wt. % to 65 wt. %, from 35 wt. % to 55 wt. %, from 35 wt. % to 45 wt. %, from 45 wt. % to 95 wt. %, from 45 wt. % to 85 wt. %, from 45 wt. % to 75 wt. %, from 45 wt. % to 65 wt. %, from 45 wt. % to 55 wt. %, from 55 wt. % to 95 wt. %, from 55 wt. % to 85 wt. %, from 55 wt. % to 75 wt. %, from 55 wt. % to 65 wt. %, from 65 wt. % to 95 wt. %, from 65 wt. % to 85 wt. %, from 65 wt. % to 75 wt. %, from 75 wt. % to 95 wt. %, from 75 wt. % to 85 wt. %, or from 85 wt. % to 95 wt. % of the second alkali metal salt based on the total weight of the waste ion exchange materials 202.

The waste ion exchange materials 202 may be introduced directly to the size reduction unit 210. The size reduction unit 210 may be operable to reduce the waste ion exchange materials 202 to produce waste ion exchange particles 212. As used in the present disclosure, particles may be spherical shaped, irregular globular shaped (i.e., non-spherical), flakes, needles, cylinders, squares, other faceted prismatic shapes, or combinations thereof. Particles can be characterized by a characteristic dimension referred to as an equivalent or nominal diameter or "particle size" (as described in Warren L. McCabe et al., *Unit Operations in Chemical Engineering* 749-758 (4th ed. 1985)). This characteristic dimension may be dependent on the particles shape or sphericity. As used herein, the sphericity of a particle may be defined as 6 times the volume of a single particle divided by the multiplication of the equivalent diameter or nominal diameter of the particle with the surface area of the particle. For example, the characteristic dimension of sphere is its diameter and will have a sphericity of 1. For a regular shape approximating a sphere, the characteristic dimension is the diameter of a sphere with a volume identical to the regular shape. For shapes that are significantly longer in one dimension than another, such as, for example, cylinders wherein the length exceeds the diameter or flakes, the characteristic dimension is generally taken to be the second largest dimension. In the case of a flake this would be the average or median thickness of the flake and in the case of a cylinder the diameter of the cylinder. Particle size and the distribution of particle size can be measured directly using optical measurement methods, sieving methods, air classification method, light obscuration methods, light scattering methods, or other methods known in the art. The size reduction unit 210 may be operable to reduce the waste ion exchange materials 202 to a particle size sufficient to be used as a feedstock materials to produce a molten salt for an ion exchange process. The size reduction unit 210 may be operable to reduce the waste ion exchange materials 202 to a particle size of from 0.10 mm to 5.0 mm.

The size reduction unit 210 may comprise any unit operable to reduce the waste ion exchange materials 202 to produce waste ion exchange particles 212. For example, the size reduction unit 210 may comprise one or more units operable to crush, cut, or pulverize the waste ion exchange materials 202 into small particles having a particle size sufficient to be used as a feedstock material to produce a molten salt for an ion exchange process. Units suitable for use as the size reduction unit 210 may include jaw crushers, gyratory crushers, burr mills, impactors, roller mills, hammer mills, pin mills, jet milts, other equipment know in the art, or combinations thereof.

The waste ion exchange particles 212 may be passed directly from the size reduction unit 210 to the regeneration unit 220. The regeneration unit 220 may be operable to regenerate the waste ion exchange particles 212 to produce a regenerated ion exchange slurry 222. The regeneration unit 220 may be operable to regenerate the waste ion exchange particles 212 by contacting the waste ion exchange particles 212 with an aqueous solution saturated with the first alkali metal salt to produce the regenerated ion exchange slurry 222. In embodiments, the aqueous solution may comprise an aqueous solution feed 214, a recycled aqueous solution 234, or both. For example, during an initial start-up of the system 200 the aqueous solution may comprise only the aqueous solution feed 214. However, during steady-state operation of the system 200 the aqueous solution may comprise only the recycled aqueous solution 234. The aqueous solution feed 214 may also be introduced during steady-state operation of the system 200 as necessary to maintain the saturation of the aqueous solution. In embodiments, the aqueous solution feed 214 may comprise one or more sources, such as the rinse water used to wash glass articles after ion exchange processes. The use of this rinse water reduces additional waste produced by ion exchange processes and, as a result, increases the efficiency of the ion exchange processes.

Without being bound by any particular theory, it is believed the contact of the waste ion exchange particles 212 with the aqueous solution saturated with the first alkali metal salt may facilitate the exchange of the cations of the second alkali metal salt from the waste ion exchange particles 212. It should be understood that the waste ion exchange particles 212 are not dissolved in the aqueous solution, such as during fractional recrystallization processes; however it is believed portions of the waste ion exchange particles 212 are rapidly restructured when contacted with the aqueous solution saturated with the first alkali metal salt, which allows for the cations of the second alkali metal salt to be released from the crystal structure of the waste ion exchange particles 212.

In embodiments, the contact of the waste ion exchange particles 212 with the aqueous solution saturated with the first alkali metal salt may increase the concentration of the first alkali metal salt in the waste ion exchange particles 212 to a suitable range (i.e., greater than 95 wt. %) to produce the regenerated ion exchange slurry 222. That is, the regeneration unit 220 may be operable to increase the concentration of the first alkali metal salt in the waste ion exchange particles 212 to be greater than 95 wt. % based on the total weight of the waste ion exchange particles 212.

In embodiments, the regeneration unit 220 may be operable to contact the waste ion exchange particles 212 with an aqueous solution saturated with the first alkali metal salt for a time sufficient to produce the regenerated ion exchange slurry 222. Accordingly, the regeneration unit 220 may be operable to contact the waste ion exchange particles 212 with an aqueous solution saturated with the first alkali metal salt for from 0.5 hours to 24 hours. The contact time may be controlled by adjusting both the flow rate of the waste ion exchange particles 212 and the aqueous solution saturated with the first alkali metal salt into the regeneration unit 220 and the flow rate of the regenerated ion exchange slurry 222 out of the regeneration unit 220.

In embodiments, the regeneration unit 220 may be operable to contact the waste ion exchange particles 212 with the aqueous solution saturated with the first alkali metal salt at a temperature less than room temperature (i.e., less than 20° C.). Cooling of the mixture of the aqueous solution saturated with the first alkali metal salt and the waste ion exchange particles 212 may be accomplished by circulation of a suitable cooling medium, such as a mixture of ethylene glycol and water, in a jacket affixed to the outer surfaces of regeneration unit 220 or through coils present in the volume of regeneration unit 220. Additionally said mixture can be withdrawn from the regeneration unit 220 circulated through an external heat exchanger and returned to the regeneration unit 220. Once the waste ion exchange particles 212 have be treated, the separated solution saturated with the first alkali metal salt can be passed through a heat exchanger and cooled to a temperature less than room temperature prior to returning the solution to regeneration unit 220. Without being bound by any particular theory, it is believed the regeneration of the waste ion exchange particles 212 at a temperature less than room temperature may prevent the potential of "freeze up" of the system 200 in the event of the system 200 becoming inoperable, such as by the loss of power. That is, even if the system 200 becomes inoperable, the materials of the system 200, such as the aqueous solution feed 214, will only become warmer. As a result, the solubility of the various salts will increase rather than decrease, which may cause precipitation of the salts and the undesirable build-up of the salts on one or more components of the system 200. Conversely, processes that are operated at temperatures greater than room temperature, may result in the solubility of the various salts decreasing and precipitating within the system in the event of operation failure.

The regeneration unit 220 may comprise any unit known in the art operable to contact the waste ion exchange particles 212 with the aqueous solution saturated with the first alkali metal salt to produce the regenerated ion exchange slurry 222. For example, the size reduction unit 210 may comprise one or more stirred tanks, such as a tank comprising an impeller, operable to agitate and/or mix the waste ion exchange particles 212 with the aqueous solution saturated with the first alkali metal salt.

The regenerated ion exchange slurry 222 may be passed directly from the regeneration unit 220 to the separation unit 230. The separation unit 230 may be operable to separate the regenerated ion exchange slurry 222 to produce the regenerated ion exchange materials 232 and the recycled aqueous solution 234. The separation unit 230 may comprise any unit known in the art operable to separate the regenerated ion exchange materials 232 from the recycled aqueous solution 234. For example, the separation unit 230 may comprise one or more solid/fluid separators operable to separate the solid particles of the regenerated ion exchange materials 232 from the liquid of the recycled aqueous solution 234, such as settling tanks, centrifuges, filtration devices, membranes, or combinations of these. At least a portion of the recycled aqueous solution 234 may be passed and/or recycled to the regeneration unit 220 for use as the aqueous solution saturated with the first alkali metal salt, either alone or in combination with the aqueous solution feed 214. In embodiments, a portion of the recycled aqueous solution 234 may be removed and/or bled from the system 200 as solution purge 236. The amount of the recycled aqueous solution 234 removed and/or bled from the system 200 may be determined by the salt content of the recycled aqueous solution 234, in order to maintain saturation of the first alkali metal salt.

The regenerated ion exchange materials 232 may be passed directly from the separation unit 230 to the drying unit 240. The drying unit 240 may be operable to dry the regenerated ion exchange materials 232 to produce a recycled ion exchange materials 242. In embodiments, the drying unit 240 may be operable to dry the regenerated ion exchange materials 232 to remove all or a substantial portion of the water in the regenerated ion exchange materials 232 to produce recycled ion exchange materials 242 that are substantially free of water. As used in the present disclosure, the term "substantially free" of a compound refers to a particular materials, such as the recycled ion exchange materials 242, that comprises less than 1 wt. % of the compound.

The drying unit 240 may comprise any unit operable to dry the regenerated ion exchange materials 232 to produce the recycled ion exchange materials 242. For example, the drying unit 240 may comprise one or more furnaces operable to heat the regenerated ion exchange materials 232 until the regenerated ion exchange materials 232 are substantially free of water to produce the recycled ion exchange materials 242. Units suitable for use as the drying unit 240 may include belt driers, tray driers, fluid bed driers, other units suitable and known in the art, or combinations thereof.

Referring still to FIG. 2, methods for recycling waste ion exchange materials may be conducted using the system 200 of the present disclosure.

The method may comprise reducing the size of the waste ion exchange materials 202 to produce the waste ion exchange particles 212. The size of the waste ion exchange materials 202 may be reduced in the size reduction unit 210 of the system 200, as described previously, to produce the waste ion exchange particles 212. The waste ion exchange particles 212 may have a particle size sufficient to be used as a feedstock materials to produce a molten salt for an ion exchange process. The waste ion exchange particles 212 may have an average particle size of from 0.25 mm to 1.0 mm. That is, greater than 50 wt. % of the waste ion exchange particles 212 (i.e., greater than 60 wt. %, greater than 70 wt. %, greater than 80 wt. %, or greater than 90 wt. % of the waste ion exchange particles 212) may have an average particle size of from 0.25 mm to 1.0 mm. For example, the waste ion exchange particles 212 may have an average particle size of from 0.25 mm to 0.95 mm, from 0.25 mm to 0.85 mm, from 0.25 mm to 0.75 mm, from 0.25 mm to 0.65 mm, from 0.25 mm to 0.55 mm, from 0.25 mm to 0.45 mm, from 0.25 mm to 0.35 mm, from 0.35 mm to 1.0 mm, from 0.35 mm to 0.95 mm, from 0.35 mm to 0.85 mm, from 0.35 mm to 0.75 mm, from 0.35 mm to 0.65 mm, from 0.35 mm to 0.55 mm, from 0.35 mm to 0.45 mm, from 0.45 mm to 1.0 mm, from 0.45 mm to 0.95 mm, from 0.45 mm to 0.85 mm, from 0.45 mm to 0.75 mm, from 0.45 mm to 0.65 mm, from 0.45 mm to 0.55 mm, from 0.55 mm to 1.0 mm, from 0.55 mm to 0.95 mm, from 0.55 mm to 0.85 mm, from 0.55 mm to 0.75 mm, from 0.55 mm to 0.65 mm, from 0.65 mm to 1.0 mm, from 0.65 mm to 0.95 mm, from 0.65 mm to 0.85 mm, from 0.65 mm to 0.75 mm, from 0.75 mm to 1.0 mm, from 0.75 mm to 0.95 mm, from 0.75 mm to 0.85 mm, from 0.85 mm to 1.0 mm, from 0.85 mm to 0.95 mm, or from 0.95 mm to 1.0 mm.

The method may further comprise regenerating the waste ion exchange particles 212 to produce the regenerated ion exchange slurry 222. The waste ion exchange particles 212 may be regenerated in the regeneration unit 220 of the system 200, as described previously, to produce the regenerated ion exchange slurry 222. For example, the waste ion exchange particles 212 may be mixed with the aqueous solution saturated with the first alkali metal salt to produce the regenerated ion exchange slurry 222. The contact of the waste ion exchange particles 212 with the aqueous solution saturated with the first alkali metal salt may increase the concentration of the first alkali metal salt in the waste ion exchange particles 212 to a suitable range (i.e., greater than 95 wt. %) to produce the regenerated ion exchange slurry 222.

The waste ion exchange particles 212 may be regenerated for a time sufficient to increase the concentration of the first alkali metal salt in the waste ion exchange particles 212 to a suitable range (i.e., greater than 95 wt. %) to produce the regenerated ion exchange slurry 222. In embodiments, the waste ion exchange particles 212 may be regenerated for from 1.0 hours to 2.0 hours. For example, the waste ion exchange particles 212 may be regenerated for from 1.0 hours to 1.75 hours, from 1.0 hours to 1.5 hours, from 1.0 hours to 1.25 hours, from 1.25 hours to 2.0 hours, from 1.25 hours to 1.75 hours, from 1.25 hours to 1.5 hours, from 1.5 hours to 2.0 hours, from 1.5 hours to 1.75 hours, or from 1.75 hours to 2.0 hours.

The waste ion exchange particles 212 may also be regenerated at a temperature less than room temperature (i.e., 20° C.). For example, the waste ion exchange particles 212 may also be regenerated at a temperature less than 18° C., less than 16° C., less than 14° C., less than 12° C., less than 10° C., less than 8° C., less than 6° C., less than 4° C., less than 2° C., or less than 0° C. As described previously, it is believed the regeneration of the waste ion exchange particles 212 at a temperature less than room temperature may prevent the potential of "freeze up" of the system 200 in the event of the system 200 becoming inoperable, such as by the loss of power.

The method may further comprise separating the regenerated ion exchange slurry 222 to produce the regenerated ion exchange materials 232 and the recycled aqueous solution 234. The regenerated ion exchange slurry 222 may be separated in the separation unit 230 of the system 200, as described previously, to produce the regenerated ion exchange materials 232 and the recycled aqueous solution 234. The method may further comprise drying the regenerated ion exchange materials 232 to produce the recycled ion exchange materials 242. The regenerated ion exchange materials 232 may be dried in the drying unit 240 of the system 200, as described previously, to produce the recycled ion exchange materials 242. After drying, the recycled ion exchange materials 242 may be substantially free of water, such as any residual water that remains from the separation of the regenerated ion exchange slurry 222. As used in the present disclosure, the term "substantially free" of a compound refers to a particular material, such as the recycled ion exchange materials 242, that comprises less than 1 wt. % of the compound. For example, the recycled ion exchange materials 242, which may be substantially free of water, may comprise less than 1 wt. %, less than 0.9 wt. %, less than 0.8 wt. %, less than 0.7 wt. %, less than 0.6 wt. %, less than 0.5 wt. %, less than 0.4 wt. %, less than 0.3 wt. %, less than 0.2 wt. %, or less than 0.1 wt. % of water, based on the total weight of the recycled ion exchange materials 242.

As described previously, the regeneration of the waste ion exchange particles 212 may increase the concentration of the first alkali metal salt in the waste ion exchange particles 212 to an amount suitable for use in an ion exchange process (i.e., greater than 95 wt. %). As such, the recycled ion exchange materials 242 may have a concentration of the first alkali metal that is greater than the concentration of the first alkali metal in the waste ion exchange materials 202. In embodiments, the recycled ion exchange materials 242 may have a concentration of the first alkali metal greater than 95 wt. % based on the total weight of the recycled ion exchange materials 242. For example, the recycled ion exchange materials 242 may have a concentration of the first alkali metal of from 95 wt. % to 100 wt. %, from 95 wt. % to 99.9 wt. %, from 95 wt. % to 99.5 wt. %, from 95 wt. % to 99 wt. %, from 95 wt. % to 98 wt. %, from 95 wt. % to 97 wt. %, from 95 wt. % to 96 wt. %, from 96 wt. % to 100 wt. %, from 96 wt. % to 99.9 wt. %, from 96 wt. % to 99.5 wt. %, from 96 wt. % to 99 wt. %, from 96 wt. % to 98 wt. %, from 96 wt. % to 97 wt. %, from 97 wt. % to 100 wt. %, from 97 wt. % to 99.9 wt. %, from 97 wt. % to 99.5 wt. %, from 97 wt. % to 99 wt. %, from 97 wt. % to 98 wt. %, from 98 wt. % to 100 wt. %, from 98 wt. % to 99.9 wt. %, from 98 wt. % to 99.5 wt. %, from 98 wt. % to 99 wt. %, from 99 wt. % to 100 wt. %, from 99 wt. % to 99.9 wt. %, from 99 wt. % to 99.5 wt. %, from 99.5 wt. % to 100 wt. %, from 99.5 wt. % to 99.9 wt. %, or from 99.9 wt. % to 100 wt. % based on the total weight of the recycled ion exchange materials 242.

As described previously, it is believed the regeneration of the waste ion exchange particles 212 does not comprise dissolving the waste ion exchange particles 212, but the rapid restructuring of the waste ion exchange particles 212, which facilitates the extraction of undesirable alkali metal cations from the waste ion exchange particles 212. As a result, it is believed the regeneration of the waste ion exchange particles 212 does not substantially affect the particle size of the resulting regenerated ion exchange materials 232. That is, the regenerated ion exchange materials 232 may have a particle size that is the same or substantially similar to the particle size of the waste ion exchange particles 212. Accordingly, the recycled ion exchange materials 242 may also have a particle size of from 0.10 mm to 5.0 mm. For example, the recycled ion exchange materials 242 may have a particle size of from 0.10 mm to 4.3 mm, from 0.10 mm to 3.6 mm, from 0.10 mm to 2.9 mm, from 0.10 mm to 2.2 mm, from 0.10 mm to 1.5 mm, from 0.10 mm to 0.80 mm, from 0.80 mm to 5.0 mm, from 0.80 mm to 4.3 mm, from 0.80 mm to 3.6 mm, from 0.80 mm to 2.9 mm, from 0.80 mm to 2.2 mm, from 0.80 mm to 1.5 mm, from 1.5 mm to 5.0 mm, from 1.5 mm to 4.3 mm, from 1.5 mm to 3.6 mm, from 1.5 mm to 2.9 mm, from 1.5 mm to 2.2 mm, from 2.2 mm to 5.0 mm, from 2.2 mm to 4.3 mm, from 2.2 mm to 3.6 mm, from 2.2 mm to 2.9 mm, from 2.9 mm to 5.0 mm, from 2.9 mm to 4.3 mm, from 2.9 mm to 3.6 mm, from 3.6 mm to 5.0 mm, from 3.6 mm to 4.3 mm, or from 4.3 mm to 5.0 mm.

The recycled ion exchange materials 242 may be suitable for use in an ion exchange process of glass articles. That is, the recycled ion exchange materials 242 may be a fully recycled waste ion exchange materials that may now be melted to form a molten salt bath suitable to effectuate the exchange of ions from the molten salt bath for ions from the glass articles. It is noted that the method described previously is described with reference to the removal of a second alkali metal salt and from a waste ion exchange materials comprising a first alkali metal salt and the second alkali metal salt. However, it should be understood that this method may be applied to a waste ion exchange materials comprising three or more alkali metal salts. For example, a waste ion exchange materials comprising first, second, and third alkali metal salts may be contacted with an aqueous solution, similar to the manner described previously, saturated with both the first and second alkali metal salts to remove the third alkali metal salt from the waste ion exchange materials.

EXAMPLES

The following examples illustrate one or more features of the present disclosure. It should be understood that these examples are not intended to limit the scope of the disclosure or the appended claims.

Example 1

In Example 1, the method of the present disclosure was replicated using samples having various concentrations of potassium nitrate and sodium nitrate. The samples were prepared by first mixing approximately 1 gram of sodium nitrate and 19 grams of potassium nitrate. The salt mixture was then melted at a temperature of 380° C. for 1 hour. The melted salt mixture was then cooled to room temperature and crushed into particles. The particles were separated using sieves into a total of four groups: particles having a particle size greater than 1.0 mm; particles having a particle size from 0.5 mm to 1.0 mm; particles having a particle size from 0.25 mm to 0.5 mm; and particles having a particle size less than 0.25 mm. Approximately 0.5 grams of each group was collected and tested for salt concentrations. Another 2.0 grams of each group was mixed with 4 milliliters of a supersaturated solution of potassium nitrate, which was prepared by mixing 50 grams of potassium nitrate with 100 milliliters of water. After mixing, the slurry was inverted 10 times and then held for 10 minutes. This pattern of inversion followed by holding was repeated three times. The slurry was then separated by vacuum filtration and the solid component was dried in an oven overnight at 50° C. The salt concentration of the dried solids was then determined by flame ionization spectroscopy. The results of Example 1 are reported in Table 1.

TABLE 1

| Sample | Salt Concentration Before Regeneration | | Salt Concentration After Regeneration | |
|---|---|---|---|---|
|  | $KNO_3$ (wt. %) | $NaNO_3$ (wt. %) | $KNO_3$ (wt. %) | $NaNO_3$ (wt. %) |
| Sample 1 | 94.5 | 4.89 | 99.0 | 0.08 |
| Sample 2 | 94.5 | 4.92 | 99.0 | 0.14 |
| Sample 3 | 92.8 | 4.60 | 98.3 | 0.64 |
| Sample 4 | 94.6 | 4.88 | 99.3 | 0.02 |

Example 2

In Example 2, particle groups were prepared in a manner similar to that described in Example 1. Portions of each group (i.e., particles having a particle size greater than 1.0 mm; particles having a particle size from 0.5 mm to 1.0 mm; particles having a particle size from 0.25 mm to 0.5 mm; and particles having a particle size less than 0.25 mm) were then contacted with a supersaturated solution of potassium nitrate for various amounts of time (i.e., 0.5 hours, 2.0 hours, and 24 hours). After contact with the supersaturated solution for the prescribed amount of time, the resulting slurry was separated by vacuum filtration and the solid component was dried in an oven overnight at 50° C. The salt concentration of the dried solids was then determined by flame ionization spectroscopy. The results of Example 2 are graphically depicted in FIG. 3.

Figure 3:
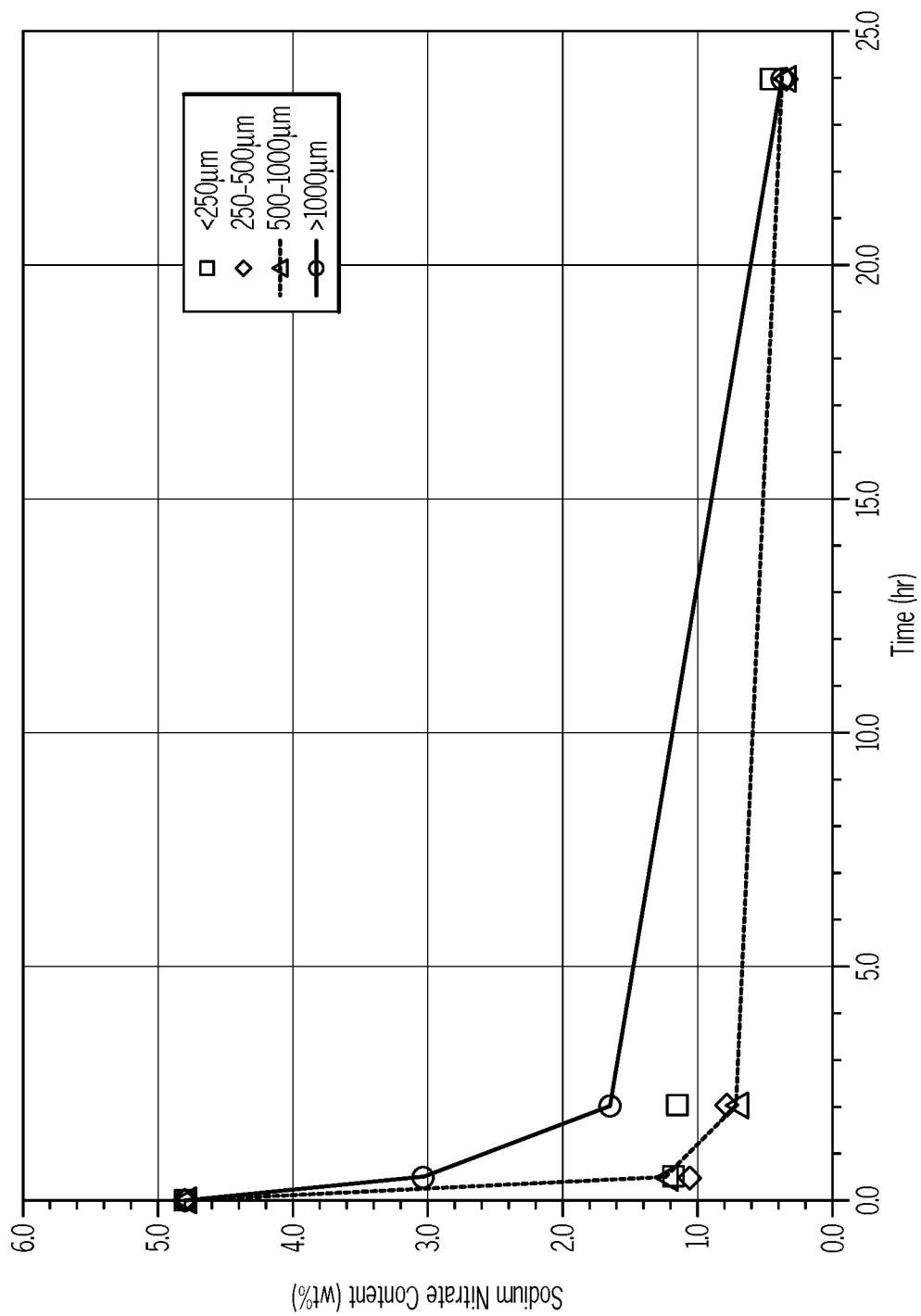
FIG. 3 graphically plots sodium nitrate concentrations (wt. %; y-axis) as a function of time regenerated (hours; x-axis) for recycled ion exchange materials having various particle sizes, according to one or more embodiments shown and described herein.

A depicted in FIG. 3, the sodium nitrate of concentrations of all sample groups were sufficiently reduced after only 0.5 hours of contact with the supersaturated solution. Moreover, the sodium nitrate of concentrations of all sample groups was further decreased with extended contact times, but contact times over 2.0 hours appeared to have diminishing returns as difference between the sodium nitrate of concentrations after 2.0 hours of contact and the sodium nitrate of concentrations after 24 hours of contact was only about 0.2 wt. %. Furthermore, according to FIG. 3, relatively larger samples (i.e., particles having a particle size greater than 1.0 mm) exhibited a reduced reduction of sodium nitrate; however, the reduction of sodium nitrate in the other samples does not appear to be correlated to the particle size of the samples.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for recycling waste ion exchange materials comprising a first alkali metal salt and a second alkali metal salt, the method comprising:
   reducing the size of the waste ion exchange materials to produce a plurality of waste ion exchange particles having particle sizes from 0.10 mm to 5.0 mm; and
   regenerating the plurality of waste ion exchange particles to produce a plurality of regenerated ion exchange particles having a concentration of the first alkali metal salt greater than a concentration of the first alkali metal salt in the waste ion exchange materials,
   wherein regenerating the plurality of waste ion exchange particles comprises:
      contacting the plurality of waste ion exchange particles with an aqueous solution saturated with the first alkali metal salt to form a regenerated ion exchange slurry; and
      separating the regenerated ion exchange slurry to produce a recycled aqueous solution and the plurality of regenerated ion exchange particles.

2. The method of claim 1, wherein the waste ion exchange materials comprise less than or equal to 95 wt. % of the first alkali metal salt based on the total weight of the waste ion exchange materials.

3. The method of claim 1, wherein the waste ion exchange materials comprise greater than or equal to 4 wt. % of the second alkali metal salt based on the total weight of the waste ion exchange materials.

4. The method of claim 1, wherein reducing the size of the waste ion exchange materials comprises introducing the waste ion exchange materials to a size reduction unit operable to crush the waste ion exchange materials.

5. The method of claim 1, wherein the plurality of waste ion exchange particles contacts the aqueous solution saturated with the first alkali metal salt for a time of from 0.5 hours to 24 hours.

6. The method of claim 1, wherein the plurality of waste ion exchange particles contacts the aqueous solution saturated with the first alkali metal salt at a temperature less than 20° C.

7. The method of claim 1, wherein contacting the plurality of waste ion exchange particles with the aqueous solution saturated with the first alkali metal salt comprises passing the plurality of waste ion exchange particles to a regeneration unit operable to contact the plurality of waste ion exchange particles with the aqueous solution saturated with the first alkali metal salt.

8. The method of claim 1, wherein separating the regenerated ion exchange slurry comprises passing the regenerated ion exchange slurry to a separation unit operable to separate solid particles of the regenerated ion exchange materials from liquid of the recycled aqueous solution.

9. The method of claim 1, further comprising drying the plurality of regenerated ion exchange particles to produce recycled ion exchange materials.

10. The method of claim 9, wherein the recycled ion exchange materials comprise less than 1 wt. % of water based on the total weight of the recycled ion exchange materials.

11. The method of claim 9, wherein the recycled ion exchange materials comprise greater than 95 wt. % of the first alkali metal salt based on the total weight of the recycled ion exchange materials.

12. The method of claim 9, wherein the recycled ion exchange materials have particle sizes from 0.10 mm to 5.0 mm.

13. The method of claim 9, wherein drying the plurality of regenerated ion exchange particles comprises passing the plurality of regenerated ion exchange particles to a drying unit operable to heat the plurality of regenerated ion exchange particles.

14. The method of claim 9, further comprising:
heating the recycled ion exchange materials to an ion exchange temperature to form a molten salt; and
submerging a glass article into the molten salt such that an ion exchange between the molten salt and the glass article occurs.

15. A system for recycling a waste ion exchange materials comprising a first alkali metal salt and a second alkali metal salt, the system comprising:
a size reduction unit operable to crush the waste ion exchange materials to produce a plurality of waste ion exchange particles having particle sizes from 0.10 mm to 5.0 mm;
a regeneration unit downstream of the size reduction unit, the regeneration unit operable to contact the plurality of waste ion exchange particles with an aqueous solution saturated with the first alkali metal salt, the contact causing at least a portion of the second alkali metal salt to diffuse from the waste ion exchange particles and produce a regenerated ion exchange slurry; and
a separation unit downstream of the regeneration unit, the separation unit operable to separate the regenerated ion exchange slurry to produce a plurality of regenerated ion exchange particles and a recycled aqueous solution.

16. The system of claim 15, wherein the regeneration unit is operable to contact the plurality of waste ion exchange particles with the aqueous solution saturated with the first alkali metal salt for a time of from 1.0 hours to 2.0 hours.

17. The system of claim 15, wherein the regeneration unit is operable to contact the plurality of waste ion exchange particles with the aqueous solution saturated with the first alkali metal salt at a temperature less than 20° C.

18. The system of claim 15, further comprising a drying unit downstream of the separation unit, the drying unit operable to heat the regenerated ion exchange particles to produce recycled ion exchange materials comprising less than 1 wt. % of water based on the total weight of the recycled ion exchange materials.

19. The system of claim 18, wherein the recycled ion exchange materials comprise greater than 95 wt. % of the first alkali metal salt based on the total weight of the recycled ion exchange materials.

* * * * *